United States Patent

Marinelli

[15] 3,639,137
[45] Feb. 1, 1972

[54] METAL FASTENING COATED WITH PRESSURE-ACTIVATABLE ENCAPSULATED SEALANT SYSTEM

[72] Inventor: Nicola Marinelli, Kettering, Ohio

[73] Assignee: The National Cash Register Company, Dayton, Ohio

[22] Filed: Oct. 9, 1969

[21] Appl. No.: 865,123

[52] U.S. Cl. ................................ 117/26, 85/1 C, 85/10 F, 85/37, 117/33, 117/62.2, 117/75
[51] Int. Cl. .................. B32b 15/08, F16b 19/04, B44d 1/16
[58] Field of Search ................... 117/75, 33, 72, 100 C, 62.2, 117/26; 85/1 C, 10 F, 37

[56] References Cited

UNITED STATES PATENTS

| | | | |
|---|---|---|---|
| 2,939,805 | 6/1960 | Johnson | 117/75 X |
| 3,018,258 | 1/1962 | Meier et al. | 260/6 |
| 3,061,455 | 10/1962 | Anthony | 117/75 X |
| 3,179,143 | 4/1965 | Schultz et al. | 117/62.2 |
| 3,275,579 | 9/1966 | Stierli et al. | 260/6 |
| 3,293,977 | 12/1966 | Dalton et al. | 85/37 |
| 3,467,544 | 9/1969 | Marinelli et al. | 117/100 C |
| 3,485,132 | 12/1969 | Hanny et al. | 85/1 C |

Primary Examiner—William D. Martin
Assistant Examiner—Ralph Husack
Attorney—Robert J. Shafer and E. Frank McKinney

[57] ABSTRACT

A pressure-activatable, curable sealant coating system is disclosed. The sealant coating comprises a multitude of minute capsules containing polymerizable polymeric material wherein each of the minute capsules is held to a workpiece—preferably to a fastening or to a substrate to be fastened—by means of adhesive or coating material having dispersed therein finely divided particles of curing agent material for the polymerizable polymeric material.

14 Claims, 4 Drawing Figures

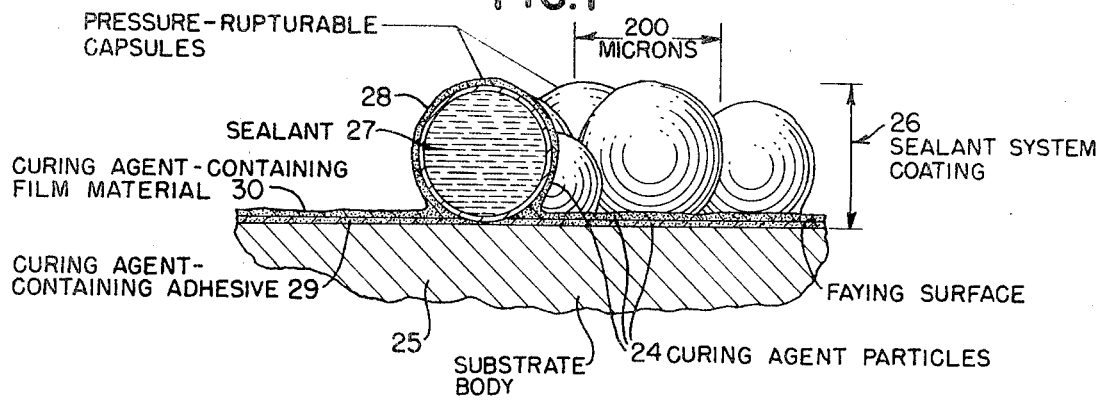
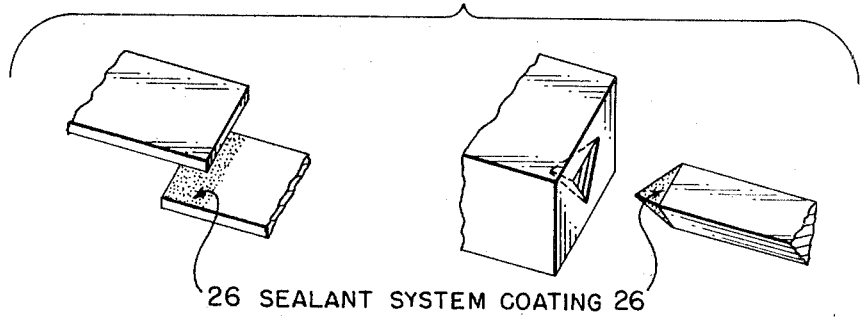
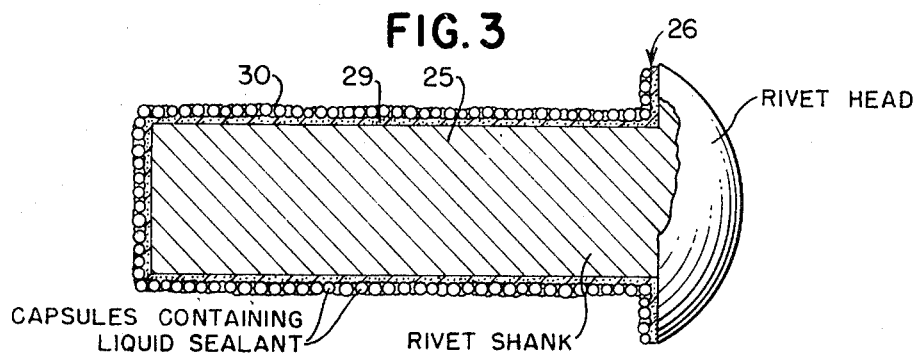
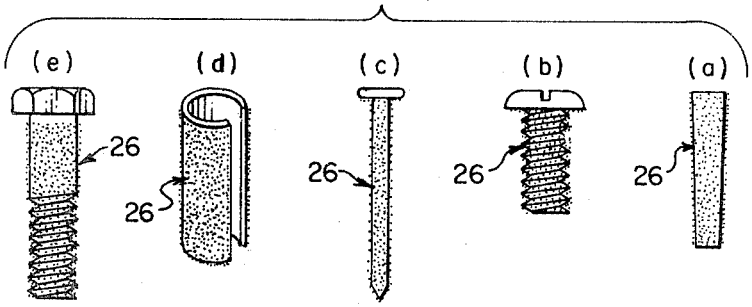
INVENTOR
NICOLA MARINELLI

METAL FASTENING COATED WITH PRESSURE-ACTIVATABLE ENCAPSULATED SEALANT SYSTEM

BACKGROUND OF THE INVENTION

1. Field of the Invention

This invention pertains to a pressure-activatable, curable sealant coating system wherein liquid, curable sealant material is contained within the confines of minute, pressure-rupturable, capsules and wherein a curing agent for the sealant material is dispersed in a polymeric film contiguous with the capsules.

In a preferred embodiment, the invention relates to driven, headed, and screw-threaded fastenings wherein at least faying areas of the fastenings are coated by capsules and by film containing a curing agent therefor.

The invention particularly relates to the above curable sealant coating systems wherein the encapsulated sealant material contains dispersed therein, a corrosion resistant material such that the combination ultimately serves the dual protective purpose of sealing and providing corrosion resistance.

Particularly, preferred embodiments of the invention are directed to fastenings with a built-in sealing function which fastenings have faying surface relation with materials to be fastened and which require jamming or shearing forces between the faying surfaces in setting and fastening operations. Among such fastenings are rivets, bolts, screws, nails, wedges, and the like, which require hammering or torque forces to set them in position. The torque forces naturally are associated with screw thread constructions. Within the term "-fastenings" are included items which do not necessarily fasten two workpiece materials together but include hooks, studs, eyebolts, cleats, and spikes, which must be attached to a supporting workpiece and which in turn find their utility in supporting or acting on other objects.

The most important use now known for the invention, is the provision of the release of curable liquid sealant material in the fastening together of overlapping metal plates, particularly as in the use of a deformable rivet type of fastening, or in the use of screw bolts which may draw such metal plates together through torque action. Use of a sealant material is quite common in the fastening arts relating to metal sheets or plates for the beneficial effects realized in, among other things, closing out environmental conditions, damping vibrations, providing additional seam strength and introducing a dielectric barrier. It is quite common that in drawing metal plates together, they become damaged in a way that they are then subject to corrosion; or that different metals, when drawn together, may have some electrolysis relation with each other. Also, metal plates may have protective surfaces damaged by the insertion and setting of the fastening. It is at once apparent that the released sealant liquid should be of such a character as to act not only as a corrosion-resistant material but also as a sealant with or without corrosion-resistant properties, or lubricating properties, or all three properties combined in any manner. The liquid and the film materials may contain tracer materials which are radiant or which may be responsive to radiation to enable one to determine whether a particular fastening in place in a workpiece has been "protected" by the practice of this invention.

2. Description of the Prior Art

It is acknowledged that it has been known heretofore to supply fastenings with a coating of pressure-rupturable, encapsulated, protective liquid. U.S. Pat. No. 3,485,132, issued Dec. 23, 1969, on the application of John F. Hanny et al., disclosed fastenings coated by a pustular construction of capsules adherent to a tacky film of polymeric material on the fastening surface. An important feature of that pustular construction was a drapery overcoating layer of polymeric film, thin relative to the size of the capsules.

U.S. Pat. No. 3,018,258, issued Jan. 23, 1962 on the application of Dale J. Meier et al., discloses a coating material consisting of curable epoxide resin dissolved in a volatile solvent and having capsules containing a curing agent dispersed therein. U.S. Pat. No. 3,275,579, issued Sept. 27, 1969, on the application of Robert F. Stierli et al., discloses a single-component liquid sealant material comprising polysulfide polymeric material and encapsulated particles of curing agent dispersed therein.

U.S. Pat. No. 3,467,544, issued Sept. 16, 1969, on the application of Nicola Marinelli et al., discloses a process for manufacturing capsules which contain a curable polymeric liquid. Those capsules are disclosed to have, partially embedded in the capsule wall material, finely divided particles of a curing agent material such that each individual capsule is an autogeneously curing entity on rupture of the capsule wall.

SUMMARY OF THE INVENTION

In the past, coatings of encapsulated protective liquid have been prepared by adhering capsules containing the liquid to a substrate by means of a tacky film of binder material. The binder material was, in most instances, hardenable and did not remain tacky. The binder material did not include additional active components and served only the single function of adhering capsules to the substrate. Likewise, in the past capsule-coated substrates have been draped by a thin protective, overlayer, binder film of polymeric material to maintain capsule-to-capsule distances and to aid in adhering the capsules to the substrate. The overlayer film included no additional active components and served only the single function of adhering capsules to the substrate.

The present invention provides for a dual function in binder films, both of the, underlayer, adhering variety and of the, overlayer protective, variety. It has been found desirable and often required to manufacture a coating system of liquid, curable, sealant material wherein the sealant material is contained in an array of minute capsules and wherein curing agent for the sealant material is also included within the coating system. The present invention provides that finely divided particles of curing agent material be dispersed in a binder film material in such an amount that curable liquid sealant material, released by rupture of capsules in the coating, will be completely cured thereby. Thus, binder film material in the coating of the present invention performs the dual functions of retaining the placement of capsules in an unruptured coating array and of ensuring substantially complete cure of released sealant material when capsules are ruptured.

The coating system of the present invention comprises a binder film material having finely divided curing agent particles dispersed therein and also having minute capsules containing curable sealant material partially embedded therein. The coating system, while eligible for use on a variety of surfaces having different surface characteristics, is particularly suitable for and adapted to application on the faying surfaces of small fastenings, as hereinabove mentioned.

Capsules to be utilized in the present invention must be pressure-rupturable and must contain curable liquid sealant material. The process by which the minute capsules are prepared is unimportant to practice of the invention. The method now preferred by applicants, however, will be disclosed hereinbelow.

Capsules identified as being "minute" can be, generally, as small as 1 to 2 microns in greatest dimension and as large as several hundred or up to 2,000 or more microns in greatest dimension. The capsules are preferredly arranged as a substantially monolayer multitude on the surfaces to be covered. The contents of a capsule can be as much as 90 percent of the entire weight of the capsule, which leaves 10 percent for the weight of the capsule wall material. Thus, the coating is left with very little capsule wall material debris after the capsules are broken in use. The detritus of the capsule wall material is insignificant in the total capsular coating weight. Capsules from 15 to 500 microns in diameter constitute the most suitable range for use with rivets, bolts, and screws of dimensions which are individually handled manually for insertion; and the best results have been obtained with capsules of about 250 microns in average dimension. These dimensions may be changed as the occasion demands for extremely large or extremely small fastenings, or under conditions of close fit. The rupture and release of the capsules undergoing jamming pressure must not require an undue amount of force per unit area to release the liquid contents. Where tight fits between the fastening and the intended fastening aperture are concerned, the capsules may be microscopic and may be present in a fabricated layer only 25 microns in thickness. Under most usual conditions, however, the total coating system thickness is about 200 to about 400 microns and sometimes may be as great as 600 microns. Kinds of capsule wall material are unimportant to practice of the invention except in the requirements of capsule wall rupturability and inertness of the capsule wall material to reaction with curable sealant material contained within. Capsule wall materials preferred presently include hydrophilic colloids and other water-soluble film-forming polymeric materials such as: gelatins, modified and unmodified; gum arabic; carrageenan; hydrolyzed and partially hydrolyzed maleic anhydride copolymers such as poly(styrene-comaleic anhydride), poly(ethylene-comaleic anhydride), and poly(vinylmethylether-comaleic anhydride); poly(vinyl alcohol); poly(vinyl pyrrolidone) and the like. Capsule wall materials can also include water-insoluble polymeric film-forming materials such as ethyl cellulose, waxes, poly(vinyl chloride), poly(ethylene), and the like, including the host of film-forming polymeric materials known to be useful as wall materials for minute capsules.

Material contained within the capsules is a curable liquid sealant material. The word "sealant" refers also to materials which may be used as polymeric but resilient fillers either pigmented or not and to materials which may be used as adhesives in a construction or manufacturing application. "Curable" means reactive to yield a hardened mass of higher-than-initial molecular weight. The sealant may have filler or other inert material dispersed into it. It is within the scope of the present invention to utilize a solution of sealant material in organic solvent or even a solution of two or more different sealant materials. A preferred embodiment of the present invention includes a liquid polysulfide resin having the general structure, $HS(C_2H_4-O-CH_2-O-C_2H_4-S-S)_nC_2H_4-O-CH_2-O-C_2H_4-SH$ wherein "$n$" is an integer from one to 25. Also present in a preferred embodiment, is a corrosion-resistant pigment or mineral compound dispersed, in finely divided form, in the polysulfide resin. Of course, the corrosion-resistant compound must be carefully selected to be substantially chemically inert with the polysulfide resin.

Binder material for the sublayer adhesive coating can be the same as binder material for the top layer coating or it can be different. Binder materials used in practice of the present invention include film-forming polymeric materials of all kinds subject only to a few reasonable criteria of selection. The binder material and the capsule wall material must be chemically and physically compatible. The binder material must not be of a kind which will work to render the curing agent inactive toward curing of the sealant material. From an economic standpoint, the binder materials should be readily available, easily applied, and physically durable as to environment, including excessive humidity and dryness and excessive deviation from operating temperatures, as would be encountered in the polar regions, the equatorial regions and the less rigorous but more common atmospheric stratosphere. The binder materials should be proof against vibrational stress, biological attack, and environmental radiation. The binder materials, either in solvent solution or in some other liquid form, must be capable of accepting finely divided particles of sealant curing agent and; in a preferred instance, the liquid form of binder material can be used as a grinding medium for complete dispersal and particle-size reduction of the curing agent material. To these ends, the sublayer, adhering, binder material chosen for a preferred embodiment is a lacquer comprising finely divided curing agent material and an alkyd resin dissolved in a readily evaporable organic liquid solvent, which lacquer may be applied to the fastening by spraying to give a light, evenly thick, layer which becomes sufficiently tacky by reason of solvent evaporation to receive and hold a dusting of capsules within a short time from application and which, after having the capsules dusted thereon, may be set to a hard condition by oven-heating at about 60° C., more or less, for a few minutes. A preferred, top layer, binder coating comprises finely divided curing agent material dispersed in an acrylic resin lacquer having a readily evaporable solvent which is dissipated in a few minutes at the above-named oven temperature, to leave a thin but hornlike layer of the resin-curing agent dispersion draped in conformance to a surface aspect of the capsules that previously have been dusted onto the tacky, sublayer coating, of alkyd resin and curing agent. The preferred thickness for dried binder films is from a few microns to as much as about 50 microns. Binder films should not be more than about 200 microns thick.

BRIEF DESCRIPTION OF THE DRAWINGS

FIG. 1 is a diagrammatic part section, part elevation view of the construction of the invention as it appears upon a substrate surface. This view is intended to show the approximate relative proportions between the thickness of the binder films to which the capsules are applied and in which they are partially embedded; the capsules themselves as to differences in size, which is of a random nature; the thin veillike abrasion-resistant binder film, which is of minor dimension in thickness with respect to the size of the capsules; and the finely divided curing agent particles with respect to the capsules and to the binder films. Even in this view, the thicknesses of the films are exaggerated with respect to liquid droplet size; and the size of the curing agent particles is exaggerated with respect to the thicknesses of the films. It should be understood that, although both films are shown here with curing agent particles dispersed therein, either one of the films alone can be used to provide the entire amount of curing agent material for practice of the invention.

FIG. 2 is a schematic representation of the use of the present invention on overlapping or mating workpiece parts either with or without the provision of additional fastenings.

FIG. 3 is a section through a headed rivet having the built-in sealing function, and showing the coating construction on its faying surfaces. The coating construction is in condition to be ruptured by being pressed against an accommodating aperture in the piece to be fastened; and is available, upon the upsetting of the end of the shank of the rivet, to become broken as the upset end of the rivet and the shank surfaces meet the surfaces of the piece to be fastened in the faying relation.

FIG. 4 shows (a) a tapered drift pin having the capsule construction on the surface, said pin being adapted to be hammered into an accommodating hole, as for fastening a wheel by its hub to an arbor, (b) a threaded screw with the capsule-sealant treatment in the grooves and on the underside of its head, (c) a headed nail similarly treated, (d) a cylindrical spreading-collar type of pin so treated, and (e) a common bolt also similarly treated.

The invention finds almost complete representation of its features in the conceptualized workpiece renditions of FIG. 2 wherein jointure of the pieces serves to rupture capsules in the sealant system coating 26 and produce reactive contact between thus-released liquid sealant and particles of curing agent initially contained by binder material but also bared by force of the workpiece contact.

In a preferred form of the invention, i.e., in the treatment of fastenings, a shanked and headed rivet 25 (FIG. 3) is provided, on the shank and underhead surfaces (the faying surfaces), with the sealant system coating 26 comprising pressure-rupturable capsules 28 containing sealant liquid 27, adhered to the rivet by curing agent-containing adhesive top layer 29 and curing agent-containing sublayer film material 30. Such rivets are utilized by insertion of the shank through prepared apertures in the workpieces to be joined, or to which the rivet is joined in case the rivet is of the stud type, and the rivet is set into place by being jammed by pounding and pressure to deform it, so that the capsules on the underside of the head, on the middle of the shank, and on the upset deformed end of the shank are brought into great pressure relation with the faying surfaces of the workpiece material being fastened, with the result that the capsules are broken, releasing a large amount of curable liquid sealant material to wet the surfaces and contact curing agent particles 24.

Exemplary of the use of rivets treated with the novel capsule-sealant constructions are those for use in the fastening of aluminum metal alloy plates to form airplane skins, in which there is an opportunity for electrolysis and corrosion to occur. It has been found that polysulfide resins and a chromate corrosion inhibitor provides an excellent corrosion-inhibiting curable liquid for application between the faying surfaces of such metal plates.

DESCRIPTION OF PREFERRED EMBODIMENTS

EXAMPLE I

This example includes preparation and use of three different components in manufacturing the curable sealant coating system of the invention: (i) capsules containing liquid polysulfide resin; (ii) sublayer adhesive binder material having curing agent material dispersed therein; and (iii) top layer binder material also having curing agent material dispersed therein.

Preparation of the capsules.

The capsule internal phase for this example was prepared as follows: 32.6 grams of barium chromate ($BaCrO_4$) having an approximate particle size of about 2 to 5 microns and 4.9 grams of meta-dinitrobenzene were thoroughly mixed into 162.6 grams of a curable liquid polysulfide resin having a molecular weight of about 1000 and a viscosity, at 25° C., of 700 to 1,200 centipoises (sold under the trademark, "LP-3" by Thiokol Chemical Corporation, Bristol, Pa., United States of America).

To make hydrophilic polymeric material-walled capsules, 20 grams of high quality, acid-extracted pigskin gelatin (285–305 grams Bloom strength, isoelectric point pH 8–9) and 20 grams of gum arabic were dissolved in 1,120 grams of distilled water maintained at a temperature of about 50° C. and agitated in a vessel of appropriate size. The pH was adjusted to 4.5. The system temperature was lowered to 40° C., and 160 grams of the above-prepared liquid polysulfide capsule internal phase mixture was poured slowly into the warm, stirring aqueous system. Agitation was adjusted to give the desired size of particles, which were globular, and the entire system was permitted to cool while constant agitation was maintained. When the agitated system had cooled to about 25° C., it was chilled in an ice bath to less than 10° C., and to it was added 10 milliliters of 25 percent, by weight, aqueous glutaraldehyde. The system was permitted to stir for about 16 hours, with the temperature gradually increasing to about 25° C. Agitation was stopped and the capsules were permitted to settle in the vessel. The supernatant liquid was poured off and an amount of distilled water equal to the discarded supernatant liquid was added to the vessel, with agitation resumed. To this stirring mixture of capsules and distilled water was added about 7 grams of a finely divided, inert, silicate filler material (sold under the trademark, "Syloid 266," by Davison Chemical Co., Baltimore, Md., United States of America). When mixing was complete, the system of capsules and inert filler material was filtered on a vacuum filtration apparatus. The resulting filter cake was removed from the filter funnel and was crumbled onto a two-unit wire mesh sieve system which would retain capsules of more than 105 microns in diameter but let the smaller capsules and free particles pass. The sieve-system was placed on a forced-air drier, and air at a temperature of approximately 25° C. was circulated through the sieves with enough force to blow any too-small capsules and the particles of excess, dry, curing agent through the top sieve. The blower was operated until the sieve contents were dry and free-flowing. The product was capsules, graded according to size, and containing liquid polysulfide resin. It should be noted that the barium chromate was present as a corrosive preventative material and that the meta-dinitrobenzene was present as a curing reaction accelerator. Either or both of those materials can be omitted. Their use is optional.

Preparation of the sublayer adhesive binder material with curing agent.

In this example, the polymeric material used to provide a tacky, underneath binder layer was a drying-type of soya-based alkyd varnish resin commercially available, for example, under the trademark "V–650" as sold by The Lowe Brothers Paint Co., Dayton, Ohio, United States of America, and having 50 percent, by weight, nonvolatile polymer material. A mixture was made of: 53.5 percent, by weight, "V–650" (trademark); 26.7 percent, by weight, naphtha (VM&P— varnish makers' and painters' naphtha) and; 19.8 percent, by weight, manganese dioxide curing agent for the polysulfide sealant resin. The manganese dioxide utilized in this example, had an average particle size of less than about 10 microns and contained 21 to 23 percent, by weight, water of hydration (as sold under the trademark of "Manganese Hydrate Number 37–G" by General Metallic Oxides Company, Jersey City, N.J., United States of America). The above mixture was milled for about 16 hours in a 2-gallon capacity stone roller mill and was then ready for use.

Preparation of the top-coating binder material with curing agent.

In this example, the polymeric material used to provide a protective overcoating binder layer was a thermoplastic polymeric material commercially available, for example, under the trademark of "Elvacite 2044" as sold by E. I. duPont de Nemours and Company, Inc., Wilmington, Del., United States of America. "Elvacite 2044" (trademark) is sold as a n-butylmethacrylate polymer. A mixture was made of: 73.5 percent, by weight, toluene; 6.5 percent, by weight, "Elvacite 2044" (trademark); and 20.0 percent, by weight, manganese dioxide as above specified. The mixture was milled for about 16 hours in a 2-gallon capacity stone roller mill and was then ready for use.

Manufacture of the top layer sealant coating on rivet fastenings.

An array of flat-headed rivets were temporarily fixed to an appropriate jig by having the rivet heads releasably cemented thereto. The rivets were then sprayed with the adhesive binder-curing agent dispersion to an average wet-film thickness of not more than about 1.5 mils (37 microns) to form layer 29, a foundation for capsule placement. Solvent from the adhesive dispersion was "flashed off" leaving a tacky layer of drying resin and the coated rivets were then covered with the capsules containing liquid polysulfide sealant mixture. Excess of the capsules were removed from the array and the rivet system was subjected to a short-duration precure in the heated atmosphere of a 60° C. oven. The capsule-coated rivets were then sprayed with the topcoating binder-curing agent dispersion to a wet-film thickness of not more than about 1.5 mils (37 microns) to form layer 30 and the entire encapsulated sealant coating system was dried.

The total increase in diameter of thus-coated rivets was not in excess of about 26.5 mils (675 microns) and has been found to average about 20 to 25 mils (510 to 635 microns). It should be noted that wet-film thicknesses are determined on flat test panels in accordance with known spray painting techniques. The dry binder films are not limited as to thickness except by pressure-rupture considerations. It is generally found that dry binder films should be less than 50 microns thick.

Although this example has been described with respect to rivets, the same procedures, of course, are followed when the compound layer material structure is installed in the other types of fastenings shown in the drawings (FIG. 4, for example).

From the foregoing, it will be apparent that it is not the particular materials used which are of paramount importance, but it is the arrangement of the materials on the fastenings which is important, so as to provide the protected but easily rupturable capsular sealant coating in ready proximity to curing agent particles in the binder films.

EXAMPLE II

This example was the same as example I except that the polysulfide resin used therein was replaced by another polysulfide resin having a molecular weight of about 4000 and a viscosity, at 25° C., of 350 to 450 poises (sold under the trademark, "LP-2," by Thiokol Chemical Corporation) and except that the barium chromate was omitted.

EXAMPLE III

This example was the same as example I except that the polysulfide used therein was replaced by another polysulfide resin having a molecular weight of about 4000 and a viscosity, at 25° C., of 350 to 450 poises (sold under the trademark, "LP-32," by Thiokol Chemical Corporation) and except that barium chromate used therein was replaced by calcium chromate, as corrosion inhibiting material.

In any or all of the above examples, many other polysulfide curing agent materials can be substituted for the specified manganese oxide. Examples of such curing agents include lead dioxide, tellurium dioxide, antimony trioxide and some chromates and dichromates, such as, zinc chromate and ammonium dichromate. In the most preferred sealant coating of the present invention, about 10 to 12 percent of the entire weight of the coating is curing agent material.

In any or all of the above examples and alternative preferred embodiments, the sealant coating could have been prepared having curing agent in the adhesive, underneath, binder layer only or in the top coat, protective, binder layer only;—either alone being sufficient, in some cases, to ensure cure of capsule-released polysulfide material.

What is claimed is:

1. A metal fastening having thereon a pressure-activatable, curable, sealant coating system comprising: a substantially monolayer multitude of minute, pressure rupturable capsules containing curable liquid sealant material; and a solid polymeric binder film, thin with respect to the capsule diameter, and having finely divided particles of curing agent for the sealant material dispersed therein and having the capsules partially embedded therein; the binder film being chemically and physically compatible with the capsule wall material and the curing agent.

2. A metal fastening having thereon a pressure-activatable, curable, sealant coating system comprising: a substantially monolayer multitude of minute, pressure-rupturable capsules containing curable liquid sealant material; a sublayer, solid, polymeric binder film having the capsules partially embedded therein; and a top layer, solid, polymeric binder film conforming to a surface aspect of the capsule monolayer both binder films being thin with respect to the capsule diameter and at least one of the binder films having finely divided particles of curing agent for the sealant material dispersed therein; the binder films being chemically and physically compatible with the capsule wall material and the curing agent.

3. The fastening of claim 2 wherein the capsules also contain a corrosion-inhibiting material.

4. The fastening of claim 2 wherein the curable liquid comprises a polysulfide resin.

5. The fastening of claim 4 wherein the curing agent is at least one member taken from the group consisting of tellurium dioxide, lead dioxide, antimony trioxide and manganese dioxide.

6. The fastening of claim 2 wherein each of the polymeric binder films are less than about 200 microns in thickness and the capsules are less than about 500 microns in average diameter.

7. A metal fastening having at least one faying surface and a built-in sealing function comprising: a solid polymeric binder film coating a faying surface of the fastening and having finely divided particles of a sealant material-curing-agent dispersed therein; and a substantially monolayer array of minute, pressure-rupturable, capsules containing a curable liquid sealant material and partially embedded in the polymeric film, which film is thin with respect to the capsule diameter; the binder film being chemically and physically compatible with the capsule wall material and the curing agent.

8. A metal fastening having at least one faying surface and a built-in sealing function comprising: a sublayer, solid, polymeric binder film coating a faying surface of the fastening; a substantially monolayer array of minute, pressure-rupturable, capsules containing a curable liquid sealant material and partially embedded in the sublayer film; and a top layer, solid, polymeric binder film conforming to a surface aspect of the capsule monolayer; both binder films being thin with respect to the capsule diameter and at least one of the binder films having finely divided particles of curing agent for the sealant material dispersed therein; the binder films being chemically and physically compatible with the capsule wall material and the curing agent.

9. The fastening of claim 8 wherein the capsules also contain a corrosion-inhibiting material.

10. The fastening of claim 8 wherein the curable liquid comprises a polysulfide resin.

11. The fastening of claim 10 wherein the curing agent is at least one member taken from the group consisting of tellurium dioxide, lead dioxide, antimony trioxide and manganese dioxide.

12. The fastening of claim 8 wherein each of the polymeric binder films are less than about 200 microns in thickness and the capsules are less than about 500 microns in average diameter.

13. A metal fastening having thereon a pressure-activatable, curable, sealant coating system comprising: a substantially monolayer multitude of pressure rupturable capsules about 15 to 500 microns in average diameter containing an intimate mixture of liquid, curable, polysulfide sealant resin and a corrosion-inhibiting material; a sublayer, solid, polymeric binder film less than about 50 microns in thickness and having the capsules partially embedded therein; and a top layer, solid, polymeric binder film less than about 50 microns in thickness and conforming to a surface aspect of the capsule monolayer; both binder films being thin with respect to the capsule diameter and at least one of the binder films having finely divided particles of manganese dioxide curing agent for the sealant material dispersed therein; the binder films being chemically and physically compatible with the capsule wall material and the curing agent.

14. A metal fastening having at least one faying surface and a built-in sealing function comprising: a sublayer, solid, polymeric binder film less than about 50 microns in thickness and coating a faying surface of the fastening; a substantially monolayer array of pressure-rupturable capsules about 15 to 500 microns in average diameter containing an intimate mixture of liquid, curably, polysulfide sealant resin and a corrosion-inhibiting material, said capsules partially embedded in the sublayer film; and a top layer, solid, polymeric binder film less than about 50 microns in thickness and conforming to a surface aspect of the capsule monolayer; both binder films being thin with respect to the capsule diameter and at least one of the films having finely divided particles of manganese dioxide curing agent for the sealant material dispersed therein; the binder films being chemically and physically compatible with the capsule wall material and the curing agent.

* * * * *